(12) United States Patent
Li et al.

(10) Patent No.: US 12,460,993 B2
(45) Date of Patent: Nov. 4, 2025

(54) METHOD AND DEVICE FOR STRUCTURAL FATIGUE LIFE TESTING OF BEARINGS

(71) Applicant: Aktiebolaget SKF, Gothenburg (SE)

(72) Inventors: Xingzheng Li, Shaoxing (CN); Keqiang Cao, Shanghai (CN); Yuefeng Chen, Tours (CN); Meng Zhang, Shanghai (CN); He Zhu, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 195 days.

(21) Appl. No.: 18/115,920

(22) Filed: Mar. 1, 2023

(65) Prior Publication Data

US 2023/0266200 A1    Aug. 24, 2023

(30) Foreign Application Priority Data

Mar. 23, 2022  (CN) .......................... 202210291044.9

(51) Int. Cl.
*G01M 13/04*    (2019.01)
(52) U.S. Cl.
CPC ................... *G01M 13/04* (2013.01)
(58) Field of Classification Search
CPC ............... G01M 13/04; G01M 13/045
See application file for complete search history.

(56) References Cited

U.S. PATENT DOCUMENTS

| | | | | |
|---|---|---|---|---|
| 4,862,738 A | * | 9/1989 | Jankowski | G01M 13/04 73/115.07 |
| 5,159,830 A | * | 11/1992 | Inoue | G01M 13/04 73/10 |
| 5,203,200 A | * | 4/1993 | Inoue | G01M 13/04 73/7 |

(Continued)

FOREIGN PATENT DOCUMENTS

CN    202011147048.7 A    5/2022

OTHER PUBLICATIONS

Machine translation of CN 202011147048.7 A. The translation is a machine translation performed by CNIPO using the website https://pss-system.cponline.cnipa.gov.cn/conventionalSearchEn. Results of multiple sections were translated by CNIPO and then pasted into a Word document to assemble a more complete translation which was then scanned into an Adobe document.

*Primary Examiner* — Eric S. McCall
(74) *Attorney, Agent, or Firm* — GARCIA-ZAMOR INTELLECTUAL PROPERTY LAW, LLC; Ruy Garcia-Zamor

(57) ABSTRACT

A method for conducting structural fatigue life testing of a bearing, in which a cam embedded in the bearing under test generates a rotational dynamic radial expansion and transmits the expansion through the bearing to a load collar compactly mounted on the periphery of the bearing, forcing the load collar to deform synchronously with the expansion, thereby applying, together with the cam, a rotational dynamic strain pressure load, mainly in the radial direction (Continued)

in both inward and outward directions, to the bearing, based on the elasticity of the load collar itself, as a test load for the structural fatigue life testing of the bearing. Based on the above method, the present invention also provides a holding mechanism that provides a rotation-resistant support for the load collar and a bearing rotation test rig capable of assembling the holding mechanism.

20 Claims, 2 Drawing Sheets

(56) References Cited

U.S. PATENT DOCUMENTS

| | | | | |
|---|---|---|---|---|
| 5,226,308 | A * | 7/1993 | Gibson | G01M 13/04 |
| | | | | 73/9 |
| 10,288,525 | B2 * | 5/2019 | Ferm | G01M 9/04 |
| 12,025,537 | B1 * | 7/2024 | Wang | G01M 7/02 |
| 2002/0083779 | A1 * | 7/2002 | Narita | G01M 13/045 |
| | | | | 73/862.191 |
| 2003/0136198 | A1 * | 7/2003 | Glaser | G01N 3/08 |
| | | | | 73/825 |
| 2010/0156652 | A1 * | 6/2010 | Davis | G01M 13/04 |
| | | | | 340/682 |
| 2016/0025592 | A1 * | 1/2016 | Lee | G01N 29/045 |
| | | | | 73/645 |
| 2016/0033362 | A1 * | 2/2016 | Taguchi | G01M 13/045 |
| | | | | 73/593 |
| 2016/0282225 | A1 * | 9/2016 | Teramoto | G01M 13/04 |
| 2018/0136081 | A1 * | 5/2018 | Lee | G01D 5/28 |
| 2021/0181047 | A1 * | 6/2021 | Hubert | F16C 25/08 |
| 2022/0026309 | A1 * | 1/2022 | Staudigel | G01M 13/04 |
| 2023/0204458 | A1 * | 6/2023 | Cardwell, III | G01M 13/045 |
| | | | | 384/448 |

* cited by examiner

METHOD AND DEVICE FOR STRUCTURAL FATIGUE LIFE TESTING OF BEARINGS

CROSS-REFERENCE TO RELATED APPLICATIONS

This application claims priority to and benefit of the following Chinese patent application: CN 202210291044.9, filed Mar. 23, 2022, which is hereby incorporated by reference in its entirety as if fully set forth herein.

TECHNICAL FIELD

The invention relates to a method for structural fatigue life testing of bearings, as well as a loading device, a holding mechanism and a test rig used in the method.

BACKGROUND ART

A method for structural fatigue life testing of flexible bearings, particularly thin-walled bearings used in harmonic reduction gears, and a loading device used in the method are disclosed in Applicant's patent application of the same title, with Application No. CN202011147048.7, filed on Oct. 23, 2020. In the schematic diagram of the device shown in FIG. 1, a loading device 10 has a substantially barrel-shaped main body 11. The main body 11 comprises a fixed end 12 formed on one axial end thereof and an open end 14 formed on the other axial end thereof, wherein the fixed end 12 is formed with a flange 12a integrally formed therewith for fixing to a bearing rotary test rig 100 by bolts 12b.

During the test, a drive shaft system 6 inputs a rotational torque which drives a cam shaft 2a to rotate, forcing the bearing 1, which is mounted outside the cam 2, to follow the elliptical long axis of the cam 2, thus creating a dynamic radial expansion in the circumferential direction. This radial expansion further forces a corresponding elastic deformation of the open ends 14 compactly assembled on the radial periphery of the bearing 1. Due to its elastic recovery property, the open end 14 exerts a dynamic rotational strain pressure load on the bearing 1, mainly in the radial direction from the outside of the radial direction. This strain pressure load is triggered exclusively by the elastic deformation of the open end 14, all the time accompanied by and synchronized with the radial expansion triggered by the cam 2 in the direction of the elliptical long axis.

The above-mentioned application further discloses that it is better to maintain a sufficient distance between the fixed end 12 and the open end 14, for example, of not less than 5 times the axial dimension (i.e. width) of the tested bearing, in order to avoid adverse effects on the free deformation of the open end 14 due to the more rigid fixed end 12 being too close to the open end 14.

As can be seen from the above disclosure, the part of the loading device 10 that applies the load to the bearing 1 is only its open end 14. Any other parts other than this, including the flange 12a, the fixed end 12, and most part of the main body 11 adjacent to the fixed end 12, provide positioning support for the loading device 10 only. After the open end 14 fails or reaches its expected life, the entire loading device 10 will be discarded as a test consumable, resulting in a huge waste of material. In addition, since the main body 11, which is formed integrally with the flange, has a slender, thin-walled cylinder structure, this poses a huge challenge for cutting and machining. Also, the existing heat treatment process is difficult to ensure that the material of the entire device can achieve the specified performance, resulting in excessive performance differences between the same batch of products, and the production cost and delivery lead time are difficult to meet the real needs.

The reality calls for a simple, effective, economical and environmentally friendly method and device for structural fatigue life testing of bearings.

SUMMARY OF THE INVENTION

To solve the above-mentioned problems, the present invention discloses a method for structural fatigue life testing of a bearing, in which a cam embedded in the bearing under test generates a rotational dynamic radial expansion and transmits the expansion through the bearing to a loading device compactly mounted on the periphery of the bearing, forcing the loading device to deform synchronously with the expansion, thereby applying, together with the cam, a rotational dynamic strain pressure load, mainly in the radial direction in both inward and outward directions, to the bearing, based on the elasticity of the loading device itself, as a test load for the structural fatigue life testing of the bearing. The loading device consists of a load collar, independently formed, of a substantially annular structure, with the loading collar being configured to restrain, with the rotation-resistant support of a holding mechanism, the circumferential displacement of the outer ring of the bearing embedded therein from following the rotation of the cam during the test, but to not prevent the load collar from applying the test load to the bearing based on the synchronous deformation.

The above method abandons the previously used flange, fixed end and most part of the barrel-shaped main body, which are large in size but only serve as positioning support, and uses only a load collar with a substantially annular structure. This simplification not only significantly reduces machining difficulties and manufacturing costs, but also makes it easier to reversely customize the loading device to the application, thus making the structural fatigue life test of bearings both economical and accurate.

On the basis of the above-mentioned method and loading device, the present invention further provides a holding mechanism adapted to be assembled on a bearing rotary test rig for providing the rotation-resistant support for the loading device. The holding mechanism comprises a restraining member configured to restrain the circumferential displacement of the loading device embedded therein from following the outer ring of the bearing under test during the test, but to not prevent the loading device from applying the test load to the bearing under test based on the simultaneous deformation.

The holding mechanism provides rotation-resistant support for the loading device of the annular structure, which is necessary for the normal application of the test load and thus is decisive for the successful implementation of the invention.

Finally, the present invention further provides a bearing rotation test rig configured to assemble the holding mechanism for holding the loading device and carrying out the method for the structural fatigue life testing of the bearing.

Such bearing test rigs are particularly suitable for retrofitting from conventional bearing rotary test rigs. The test method described in the present invention can be carried out as long as the holding mechanism can be reliably assembled on the test rig. This kind of test rig not only has low difficulty in modification, but also has cost advantages.

Various embodiments and beneficial technical effects of the present invention will be described in detail with reference to the accompanying drawings below.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings.

DETAILED DESCRIPTION OF EMBODIMENTS

Figure 1:
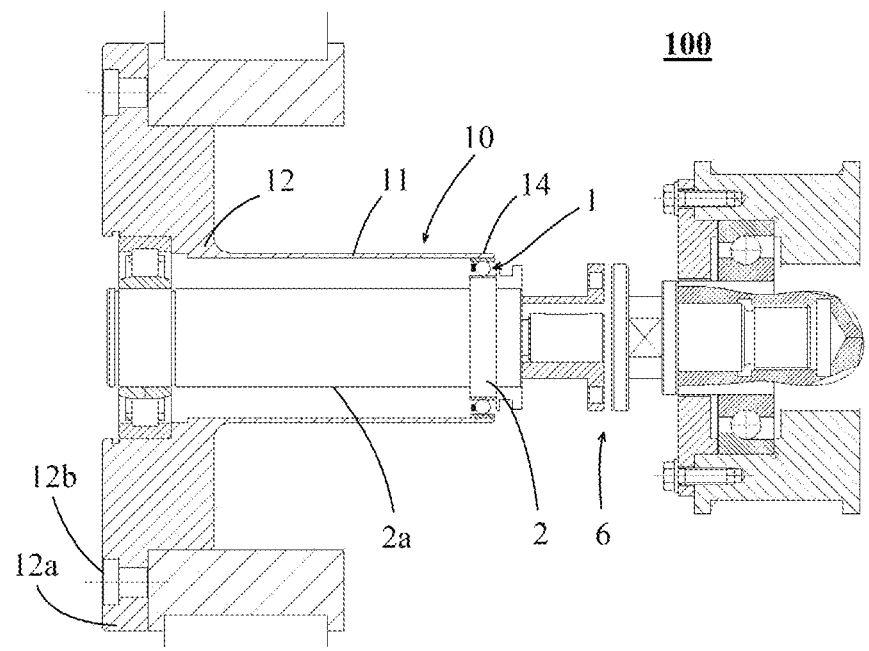
FIG. 1 shows a schematic diagram of the existing method for the structural fatigue life testing of a bearing.

Certain terminology is used in the following description for convenience only and is not limiting. The words "right," "left," "up," and "down" designate the directions as they would be understood by a person facing in the viewing direction unless specified otherwise. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "outer" and "inner" refer to directions away from and toward, respectively, the geometric center of the specified element, or, if no part is specified, the geometric center of the invention. Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The language "at least one of 'A', 'B', and 'C'," as used in the claims and in corresponding portions of the specification, means "any group having at least one 'A'; or any group having at least one 'B'; or any group having at least one 'C'; —and does require that a group have at least one of each of 'A', 'B', and 'C'." More specifically, the language 'at least two/three of the following list' (the list itemizing items '1', '2', '3', '4', etc.), as used in the claims, means at least two/three total items selected from the list and does not mean two/three of each item in the list. The term "interior", as used in the claims and corresponding portions of the specification means the area proximate to the center of the invention. The term "exterior" similarly defines the area not in proximity to the center of the invention. Additionally, the words "a" and "one" are defined as including one or more of the referenced items unless specifically stated otherwise. The terminology includes the words specifically mentioned above, derivatives thereof, and words of similar import.

Figure 2:
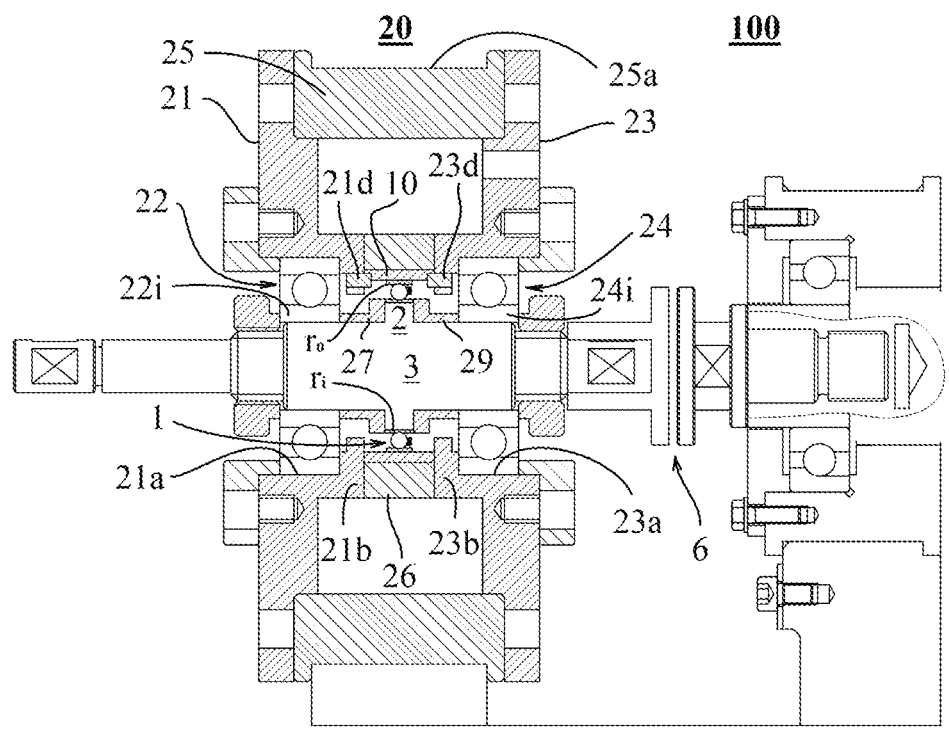
FIG. 2 shows a schematic diagram of the method of conducting the structural fatigue life testing of a bearing using a load collar.

FIG. 2 shows a schematic diagram of the method by which a loading device of an annular structure is used to perform the bearing structural fatigue life test. As can be seen in the figure, the loading device 10 is a load collar having a substantially annular structure. It should be noted that in the present invention, the term "substantially annular" also includes the case of barrel-shaped (cylindrical) structures. Depending on the ratio between the axial dimension (i.e. width) and the radial dimension (i.e. outer diameter), the load collar 10 can transition between a substantially annular and a substantially cylindrical form. In the case of the cylindrical form, the axial dimension of the load collar 10 may be larger than the radial dimension thereof. In typical cases, the load collar 10 may be made of a metal material such as bearing steel. In the test condition, the load collar 10 is mounted on the radial periphery of the bearing 1 under test. In other words, a strain wave generator formed by a disc-shape cam 2 embedded in the bearing 1 under test is compactly assembled in the bore of the load collar 10. The bore of the load collar 10 can be selected to match the size of the outer ring $r_o$ of the bearing 1, so as to form a matching pattern of equal amplitude of strain with the bearing 1. The axial dimension (i.e. width) of the load collar 10 is generally chosen to be larger than the axial dimension (i.e. width) of the outer ring $r_o$ of the bearing for purposes of increased friction.

A drive shaft system 6 inputs rotational torque to drive the camshaft 3 to rotate, forcing the bearing 1 fitted on the periphery of the cam 2 to follow the elliptical long axis of the cam 2 to generate dynamic radial expansion in the circumferential direction. The expansion further forces a corresponding elastic deformation of the load collar 10 which is compactly assembled outside the bearing outer ring $r_o$. Under the restraint of a restraining member 26 (described later), the load collar 10, together with the bearing outer ring $r_o$ fitted therein, is restrained from following the rotation of the cam 2. Due to its elastic recovery property, however, the load collar 10 applies a strain pressure load on the bearing 1 from the radially outer side, mainly in the radial direction. The strain pressure load is mainly triggered by the elastic deformation of the load collar 10, thus for all the time accompanied by and synchronized with the radial expansion triggered by the cam 2 in the direction of the elliptical long axis of the cam.

It is not difficult to understand that the strain pressure load from the load collar 10 is positively correlated with the radial expansion induced by the morphology of the cam 2. For example, the greater the expansion of the elliptical long axis of the cam 2 beyond the bore of the load collar 10, the greater the strain pressure exerted by the load collar 10 on the bearing 10 under test based on the elastic recovery property of the collar. This can be correctly interpreted from Hooke's law that stress and strain are in proportion to each other during the elastic deformation phase of a material. In addition, the material, shape and size of the load collar also have a decisive influence on its modulus of elasticity. For example, the wall thickness and axial dimension (i.e., width) of the load collar have a critical effect on its elastic properties, all other factors being equal.

The above features make the load collar particularly suitable for reverse customization according to the application, i.e. setting the test load according to the application load and then customizing the load collar according to the test load. Therefore, for different types and specifications of bearings, one can prepare different load collars in advance to standardize and serialize the test, thereby making the bearing structural fatigue life test a standard laboratory simulation test. Calculations show that the axial dimension of the load collar should not exceed 10 times the axial dimension of the bearing under test, preferably not more than 5 times the axial dimension of the bearing under test, and further preferably not more than 3 times the axial dimension of the bearing under test. In addition, the wall thickness of the load collar is preferably between 1 and 4 mm, and further preferably between 2 and 3 mm. The load collar of the above size is not only simple in structure and convenient in processing, but also accurate in customizing the load, which has both practical value and cost advantages.

Figure 3:
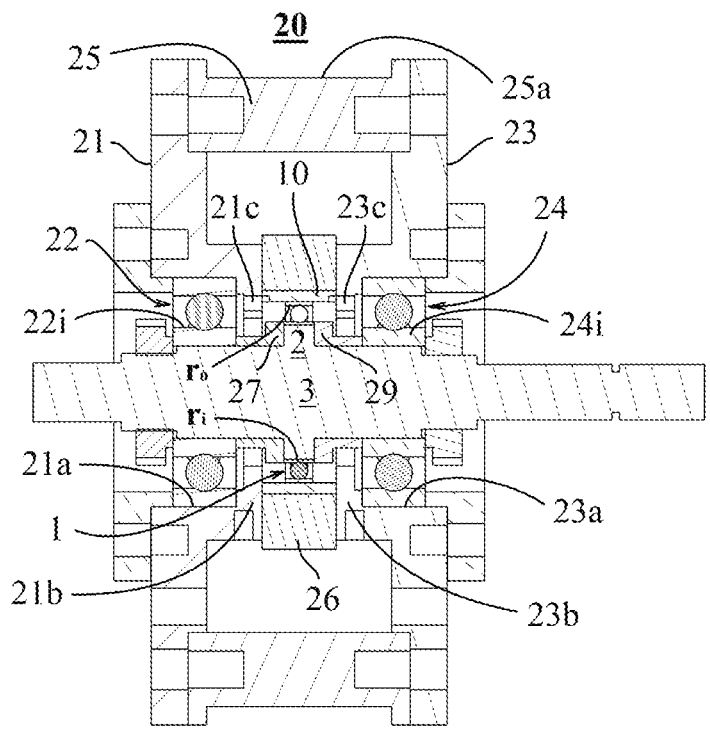
FIG. 3 shows an enlarged cross-section of the holding mechanism in a radial view.
Figure 4:
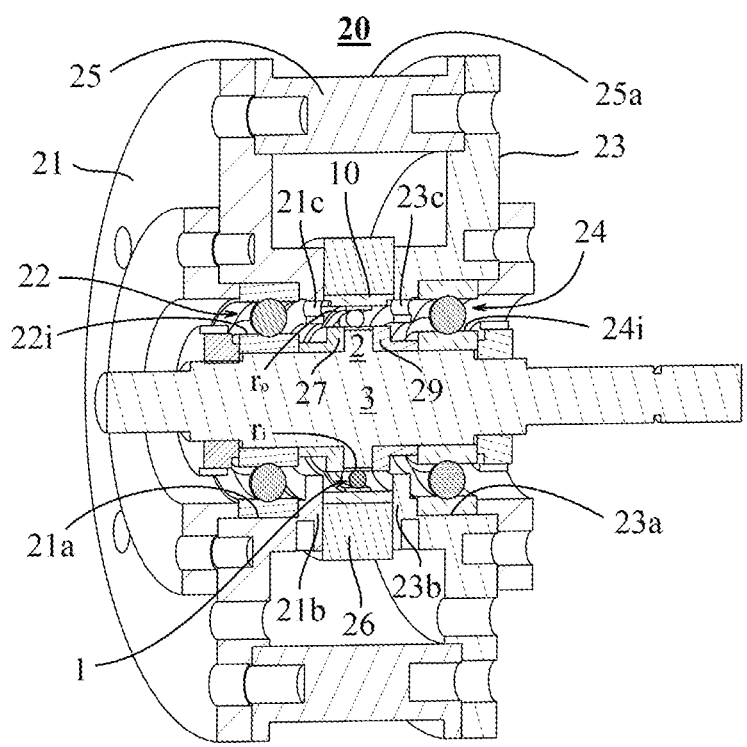
FIG. 4 shows a perspective cross-section of the holding mechanism in a lateral view.

FIGS. 3 and 4 show the cross-sectional views of the holding mechanism from different angles of view, respectively. In the specific embodiment shown, the holding mechanism 20 provides a "rotation-resistant support" for the load collar 10, which support can be achieved by a flexible restraining member 26. The flexible restraining member 26 may be made at least partially of an elastomeric material (e.g., natural or synthetic rubber) with an inner diameter slightly smaller than the outer diameter of the load collar 10, thus able to fit compactly around the radial periphery of the load collar 10. In typical cases, the restraining member 26 may be a complete ring of resilient material or a number of blocks of resilient material distributed discretely around the circumferential periphery of the load collar 10. In the test condition, the flexible restraining member 26 is able to provide a rotation-resistant restraint to the load collar 10, i.e. it prevents, by frictional forces, the circumferential displacement of the load collar 10 and the bearing outer ring $r_o$ fitted in the load collar 10 from following the rotation of the cam 2. However, the radial strain load of the restraining member 26 does not cause excessive radial restraint on the load collar 10, i.e. the radial strain load from the flexible restraining member 26 is negligible compared to the radial strain load from the load collar 10, or at least does not significantly affect the test load from the load collar 10.

In the specific embodiment shown in FIGS. 3 and 4, the holding mechanism 20 consists mainly of clamping plates 21, 23 on both sides thereof and an annular wall 25 that defines the spacing between the clamping plates in the axial direction. The clamping plates 21, 23 are all complete disc-shaped parts (only partially shown in the figure), with peg holes distributed along their circumference for attachment to the annular wall 25. The annular wall 25 is formed with a recess 25a for fitting into an annular base (not shown) on the bearing test rig 100 for securely fixing the holding mechanism 20 to the rig 100.

The clamping plates 21, 23 are formed with bearing seats 21a, 23a at substantially central positions thereof for providing rotational support for the camshaft 3 by means of rolling bearings 22, 24. The radial expansion of the cam 2 in the direction of its elliptical long axis causes the bearing 1 under test, the load collar 10 and the restraining member 26, which are assembled on the circumferential periphery of the cam, to fit together in a compact sequence. Positioning washers 27, 29, which obtain support from inner rings 22i, 24i of the bearings 22, 24, are placed against the inner ring $r_i$ of the bearing 1 under test from both axial sides, respectively, for preventing the bearing 1 from slipping off the cam 2 during test. The clamping plates 21, 23 are formed with shoulders 21b, 23b on opposite sides thereof for providing positioning support for the flexible restraining member 26 from both axial sides, so that the restraining member 26, as described above, is able to provide rotation-resistant support for the load collar 10.

As an alternative, the rotation-resistant support may also be implemented by a rigid restraining member. Said rigid restraining member, for example, may be positioning pins 21d, 23d (as shown in FIG. 2) embedded in pin holes 21c, 23c (as shown in FIGS. 3 and 4) of the clamping plates. In the specific embodiment shown in FIG. 2, the positioning pins 21d, 23d are compactly embedded in the pin holes 21c, 23c, providing a rotation-resistant torque to the load collar 10 by fitting into local grooves formed on the circumference of the load collar 10. The positioning pins 21d, 23d, however, do not prevent the load collar 10 from deforming synchronously with the radial expansion of the rotating cam 2. It can be seen that, through the cooperation of rigid components, the restraining member can also limit the rotational freedom of the load collar in the circumferential direction, but does not prevent the freedom of expansion or contraction of the load collar in the radial direction.

In the embodiment shown in FIGS. 3 and 4, the flexible restraining member 26 may be used alone to implement the described rotation-resistant support, while in the embodiment shown in FIG. 2, both the flexible restraining member 26 and the rigid restraining members 21d, 23d may be used to implement the described rotation-resistant support. It follows that any form of restraining member which provides rotation-resistant support for the load collar and which does not prevent the free deformation of the load collar in the radial direction can be used to hold the load collar.

As can be seen from the above description, the load collar 10 is fixed to the bearing rotary test rig 100 by the holding mechanism 20. By inputting rotational power to the camshaft 3, it is possible to perform the bearing structural fatigue life test described in the present invention. This feature allows conventional bearing rotary test rigs to be used for the test described, with low technical requirements and costs for equipment modifications.

In the above description, the elliptical cam 2 has been used as an excitation component to perform the structural fatigue life test of bearings. It should be noted that the term "elliptical" in the present invention is a broad concept, encompassing both the standard elliptical shape and the oval shape, and even a shape similar to that of a sports field track (consisting of two straight tracks and two semi-circular curved tracks connected). In fact, any oblong figure with a major axis and a minor axis can be understood as the roughly elliptical shape described in the present invention. Not only that, rounded polygons (polygons with rounded sides and corners), for example, rounded triangles, rounded squares, etc., can also be used as the contour basis of the cam, to excite the loading device to generate the strain pressure load following the rotation of the cam.

In addition, this specification describes an improved bearing structural fatigue life testing method and apparatuses used in the method from the application of thin-walled bearings in harmonic reducers. Obviously, the above method and apparatuses are also suitable for testing other types of bearings that have structural fatigue performance requirements.

Those skilled in the art should understand that the method and apparatuses are not limited by the above specific embodiments. More general technical solutions will be subject to the limitations in the appended claims. For any modifications and improvements of the present invention, as long as they meet the limitations of the appended claims, they fall within the protection scope of the present invention.

The invention claimed is:

1. A method for testing a structural fatigue life of a bearing, a cam being embedded in the bearing, the method comprising the following steps:
   rotating a cam shaft with the cam located thereon, the bearing being fitted over the cam such that rotation of the cam generates a rotational dynamic radial expansion of the bearing,
   locating a loading device about an outer ring of the bearing such that the rotational dynamic radial expansion experienced by an outer ring of the bearing is transmitted to the loading device,
   preventing the loading device and the outer ring from rotating with the cam while the loading device undergoes elastic deformation that corresponds to the the rotational dynamic expansion of the outer ring,
   due to an elastic recovery property of the loading device during rotation of the cam, the loading device generates a rotational dynamic strain pressure load on the bearing from a radially outer side thereof,
   rotating the cam to generate the rotational dynamic pressure load on the bearing as a test load for testing the structural fatigue life of the bearing, wherein
   the loading device comprises a load collar, the load collar being configured to restrain, with a rotation-resistant support of a holding mechanism, the circumferential displacement of the outer ring of the bearing embedded therein from following the rotation of the cam during the test while still allowing the load collar to apply the test load to the bearing.

2. The method according to claim 1, wherein the cam has a roughly elliptical or rounded polygonal profile.

3. The method according to claim 2, wherein a material, wall thickness and/or axial dimension of the load collar is adjustable to accommodate the load required by the application of the bearing.

4. A loading device for structural fatigue life testing of a bearing having an outer ring, the loading device comprising:
   a load collar being adapted to accommodate a strain wave generator formed by a cam embedded in the bearing being tested,
   wherein the loading device is capable of deforming synchronously with a rotational radial expansion of the outer ring of the bearing which is driven by the strain wave generator, so as to apply, together with the cam, a dynamic rotational strain pressure load, mainly in the radial direction, to the bearing, based on the elasticity of the load collar, as a test load for the structural fatigue life testing of the bearing.

5. The loading device according to claim 4, wherein the axial dimension of the load collar does not exceed 10 times the axial dimension of the outer ring of the bearing.

6. The loading device according to claim 5, wherein an inner diameter of the load collar matches the dimensions of the outer ring of the bearing and forms a matching pattern of equal strain with the bearing.

7. The loading device according to claim 5, wherein the axial dimension of the load collar does not exceed 5 times the axial dimension of the outer ring of the bearing.

8. The loading device according to claim 7, wherein an inner diameter of the load collar matches the dimensions of the outer ring of the bearing and forms a matching pattern of equal strain with the bearing.

9. A holding mechanism to provide a rotation-resistant support for the loading device of claim 7, the holding mechanism comprising a restraining member configured to restrain the circumferential displacement of the loading device embedded therein from following the outer ring of the bearing under test during the test, but to not prevent the loading device from applying the test load to the bearing under test based on the simultaneous deformation.

10. The holding mechanism according to claim 9, wherein the restraining member can be a flexible restraining member compactly mounted on the radial periphery of the loading device and/or a rigid restraining member limiting only the rotational freedom of the loading device in the circumferential direction.

11. A holding mechanism to provide a rotation-resistant support for the loading device of claim 5, the holding mechanism comprising a restraining member configured to restrain the circumferential displacement of the loading device embedded therein from following the outer ring of the bearing under test during the test, but to not prevent the loading device from applying the test load to the bearing under test based on the simultaneous deformation.

12. The holding mechanism according to claim 11, wherein the restraining member can be a flexible restraining member compactly mounted on the radial periphery of the loading device and/or a rigid restraining member limiting only the rotational freedom of the loading device in the circumferential direction.

13. The loading device of claim 11, wherein the holding mechanism is assembled on a bearing rotation test rig.

14. The loading device according to claim 4, wherein the inner diameter of the load collar matches the dimensions of the outer ring of the bearing and forms a matching pattern of equal strain with the bearing.

15. A holding mechanism to provide a rotation-resistant support for the loading device of claim 14, the holding mechanism comprising a restraining member configured to restrain the circumferential displacement of the loading device embedded therein from following the outer ring of the bearing under test during the test, but to not prevent the loading device from applying the test load to the bearing under test based on the simultaneous deformation.

16. The holding mechanism according to claim 15, wherein the restraining member can be a flexible restraining member compactly mounted on the radial periphery of the loading device and/or a rigid restraining member limiting only the rotational freedom of the loading device in the circumferential direction.

17. A holding mechanism to provide a rotation-resistant support for the loading device of claim 4, the holding mechanism comprising a restraining member configured to restrain the circumferential displacement of the loading device embedded therein from following the outer ring of the bearing under test during the test, but to not prevent the loading device from applying the test load to the bearing under test based on the simultaneous deformation.

18. The loading device of claim 17, wherein the holding mechanism is assembled on a bearing rotation test rig.

19. The holding mechanism according to claim 17, wherein the restraining member can be a flexible restraining member compactly mounted on the radial periphery of the loading device and/or a rigid restraining member limiting only the rotational freedom of the loading device in the circumferential direction.

20. The loading device of claim 19, wherein the holding mechanism is assembled on a bearing rotation test rig.

\* \* \* \* \*